United States Patent
Salter et al.

(10) Patent No.: US 9,586,523 B2
(45) Date of Patent: Mar. 7, 2017

(54) VEHICLE LIGHTING ASSEMBLY

(71) Applicant: Ford Global Technologies, LLC, Dearborn, MI (US)

(72) Inventors: Stuart C. Salter, White Lake, MI (US); James J. Surman, Clinton Township, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 401 days.

(21) Appl. No.: 14/508,605

(22) Filed: Oct. 7, 2014

(65) Prior Publication Data

US 2015/0138802 A1    May 21, 2015

Related U.S. Application Data

(63) Continuation-in-part of application No. 14/086,442, filed on Nov. 21, 2013.

(51) Int. Cl.
| | |
|---|---|
| *B60Q 1/56* | (2006.01) |
| *B60Q 1/00* | (2006.01) |
| *B60Q 1/26* | (2006.01) |
| *B60Q 1/30* | (2006.01) |
| *F21S 8/10* | (2006.01) |

(52) U.S. Cl.
CPC ............. *B60Q 1/56* (2013.01); *B60Q 1/0035* (2013.01); *B60Q 1/2607* (2013.01); *B60Q 1/2669* (2013.01); *B60Q 1/302* (2013.01); *F21S 48/211* (2013.01); *F21S 48/214* (2013.01); *F21S 48/215* (2013.01); *F21S 48/2212* (2013.01); *F21S 48/238* (2013.01)

(58) Field of Classification Search
CPC .. B60Q 1/0035; B60Q 1/2607; B60Q 1/2669; B60Q 1/30; B60Q 1/302; B60Q 1/56; F21S 48/211; F21S 48/214; F21S 48/215; F21S 48/2212; F21S 48/238
USPC ................. 362/497–499, 509–510, 543–549
See application file for complete search history.

(56) References Cited

U.S. PATENT DOCUMENTS

| | | | |
|---|---|---|---|
| 5,709,453 | A | 1/1998 | Krent et al. |
| 6,031,511 | A | 2/2000 | DeLuca et al. |
| 6,117,362 | A | 9/2000 | Yen et al. |
| 6,494,490 | B1 | 12/2002 | Trantoul |
| 6,523,976 | B1 | 2/2003 | Turnbull et al. |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |

(Continued)

FOREIGN PATENT DOCUMENTS

| | | |
|---|---|---|
| CN | 2375509 Y | 4/2000 |
| CN | 201169230 Y | 12/2008 |

(Continued)

*Primary Examiner* — Jason Moon Han
(74) *Attorney, Agent, or Firm* — Jason Rogers; Price Heneveld LLP

(57) ABSTRACT

A vehicle lighting assembly is provided herein. The assembly includes a housing including a light permeable portion and a photoluminescent portion. A first light source and a second light source are each located inside the housing. Light emitted from the first light source is outputted from the housing via the light permeable portion and light emitted from the second light source excites the photoluminescent portion to generate a visible light that is outputted from the housing.

16 Claims, 3 Drawing Sheets

(56) References Cited

U.S. PATENT DOCUMENTS

| | | |
|---|---|---|
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,318,663 B2 | 1/2008 | Verbrugh et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,235,569 B2 | 8/2012 | Chambers et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 101337492 A | 1/2009 |
| CN | 201193011 Y | 2/2009 |
| CN | 202791740 U | 3/2013 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| JP | 2013154657 A | 8/2013 |
| WO | 2006047306 A1 | 5/2006 |
| WO | 2014068440 A1 | 5/2014 |

VEHICLE LIGHTING ASSEMBLY

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE," the entire disclosure of which is hereby incorporated herein by reference.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a vehicle lighting assembly is provided. The assembly includes a housing including a light permeable portion and a photoluminescent portion. A first light source and a second light source are each located inside the housing. Light emitted from the first light source is outputted from the housing via the light permeable portion and light emitted from the second light source excites the photoluminescent portion to generate a visible light that is outputted from the housing.

According to another aspect of the present invention, a vehicle lighting assembly is provided. The assembly includes a housing including a first compartment having a light permeable portion and a second compartment having a photoluminescent portion. A first light source is located in the first compartment and a second light source is located in the second compartment. Light emitted from the first light source is outputted from the housing via the light permeable portion and light emitted from the second light source excites the photoluminescent portion to generate a visible light that is outputted from the housing.

According to another aspect of the present invention, a trim piece assembly is provided. The assembly includes a housing including a light permeable portion and a photoluminescent portion. A first light source and a second light source are each located inside the housing. Light emitted from the first light source is outputted from the housing via the light permeable portion and light emitted from the second light source excites the photoluminescent portion to generate a visible light that is outputted from the housing.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a vehicle lighting assembly that advantageously employs one or more photoluminescent structures configured to convert light received from an associated light source and re-emit the light at a different wavelength.

Figure 1A:
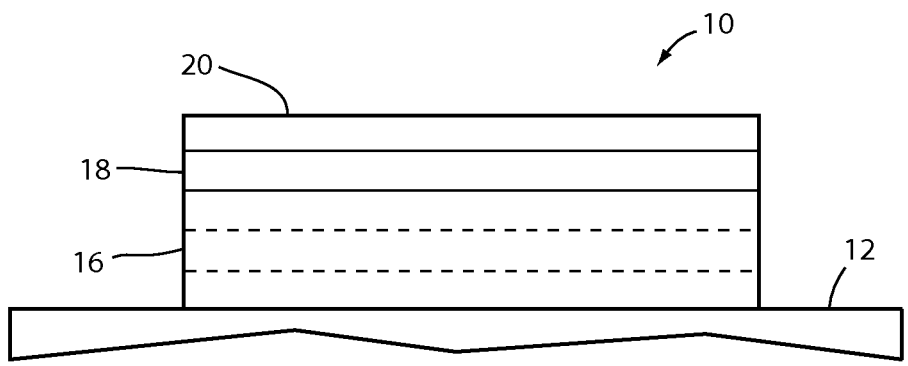
FIG. 1A illustrates a photoluminescent structure coupled to a support member, according to one embodiment.
Figure 1B:
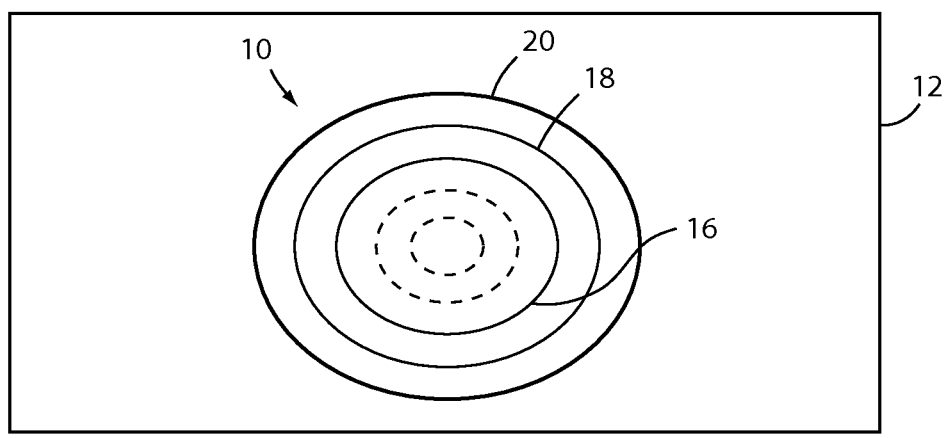
FIG. 1B illustrates a photoluminescent structure coupled to a support member, according to another embodiment.
Figure 1C:
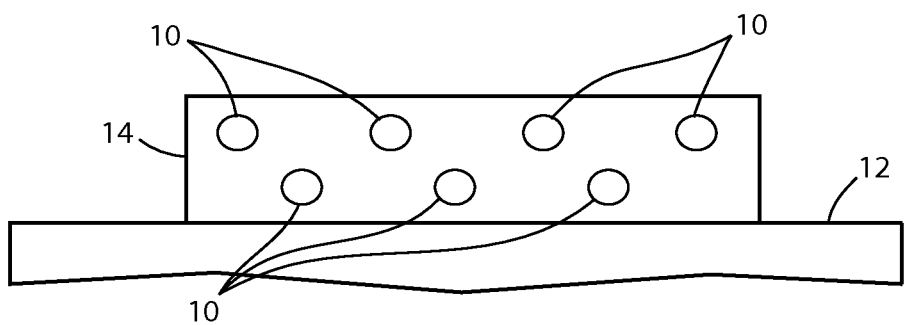
FIG. 1C illustrates a photoluminescent structure coupled to a support member, according to yet another embodiment.

Referring to FIGS. 1A-1C, various exemplary embodiments of a photoluminescent structure 10 are shown, each capable of being coupled to a support member 12, which may correspond to a vehicle fixture or vehicle related piece of equipment. In FIG. 1A, the photoluminescent structure 10 is generally shown rendered as a coating (e.g. a film) that may be applied to a surface of the support member 12. In FIG. 1B, the photoluminescent structure 10 is generally shown as a discrete particle capable of being integrated with a support member 12. In FIG. 1C, the photoluminescent structure 10 is generally shown as a plurality of discrete particles that may be incorporated into a support medium 14 (e.g. a film) that may then be applied (as shown) or integrated with the support member 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelength of light are outputted from the photoluminescent structure 10 at the same time, the wavelengths of light may mix together and be expressed as a multicolor light.

In some embodiments, light that has been down converted or up converted may be used to excite other photoluminescent material(s) found in the energy conversion layer 16. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various implementations discussed herein, each of the photoluminescent structures may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired support member. The energy conversion layer 16 may be applied to a support member by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a support member using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g. the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are included herein by reference in their entirety.

Figure 2:
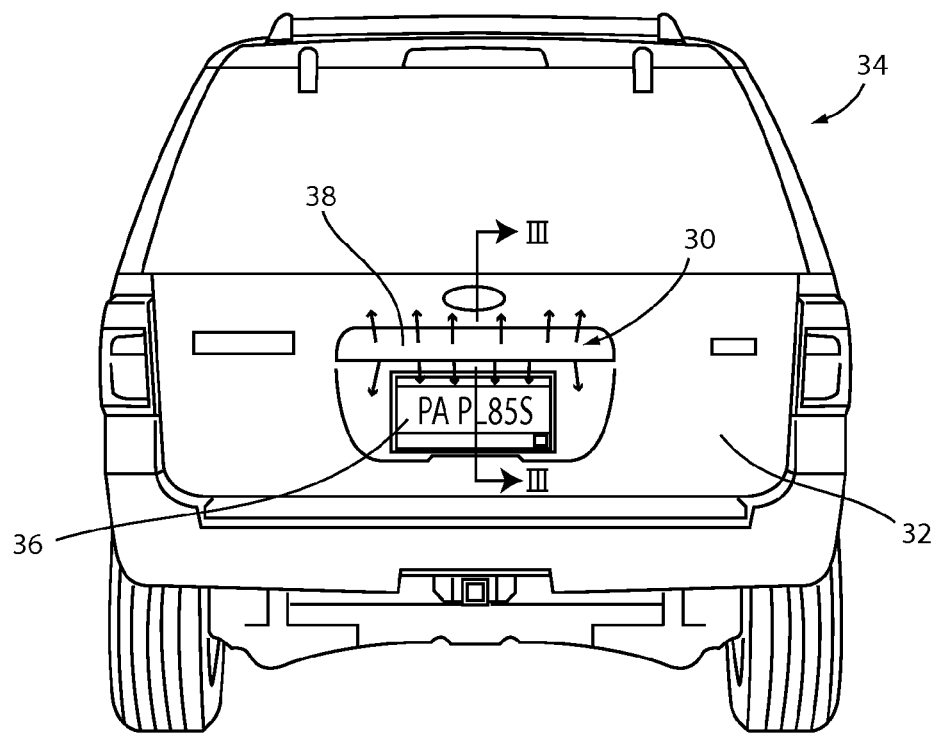
FIG. 2 illustrates a vehicle lighting assembly located on a rear portion of a vehicle.

Referring to FIG. 2, a vehicle lighting assembly 30 is shown is shown configured as an exterior trim piece located on a rear portion 32 of a vehicle 34 and is positioned above a rear vehicle license plate 36. The lighting assembly 30 includes a visible front portion 38 and a lower portion (not shown) that is proximate the license plate 36 and is generally concealed from observers located behind the vehicle 34. According to one embodiment, which will be described below in greater detail, the lighting assembly 30 may be configured to provide two distinct lighting functions. Specifically, the front portion 38 of the light assembly 30 may illuminate to function as a stoplight and/or a taillight whereas the lower portion may illuminate the license plate 36 as a styling feature. Additionally, the illumination of the license plate 36 also increases its visibility in dark conditions. With respect to the present embodiment, the lighting assembly 30 may be provided to supplement existing lighting on the vehicle 34 or may be provided as a substitute thereof. For example, the lighting assembly 30 described above may replace a conventional center high-mount stop lamp (CHMSL).

Figure 3:
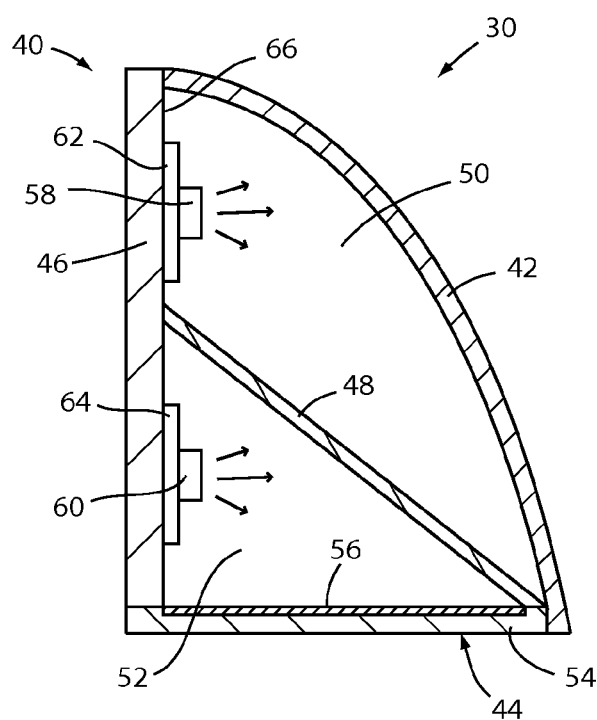
FIG. 3 is a cross-sectional view of a vehicle lighting assembly taken along lines III-III of FIG. 2.

Referring to FIG. 3, a cross-section of the lighting assembly 30 is shown according to one embodiment. The lighting assembly 30 includes a housing 40 having a light permeable portion 42 that may define the front portion 38 described previously herein, a photoluminescent portion 44 that may define the bottom portion described previously herein, and a rear portion 46 that may be secured to the rear of a vehicle. The lighting assembly 30 may also include a partitioning member 48 located therein that divides the housing 40 into a first compartment 50 and a second compartment 52 that may be located above the first compartment 50. The partitioning member 48 may be engaged to the rear portion 46 and the photoluminescent portion 44 and/or the light permeable portion 42. Further, the partitioning member 48 may be positioned at an acute angle relative to the photoluminescent portion 44. The light permeable portion 42, photoluminescent portion 44, rear portion 46, and partitioning member 48 may each be constructed from a substantially rigid material (e.g. plastic) and joined together via laser welding or other suitable means. The light permeable portion 42 may be metalized to have an outer metallic appearance while in a non-illuminated state. The photoluminescent portion 44 may include a light dispersing optic 54 and at least one photoluminescent structure 56 coupled to the light dispersing optic 54. The photoluminescent structure 56 may be integrated with the optic 54 or otherwise applied thereto as a coating, paint, etc.

Figure 4:
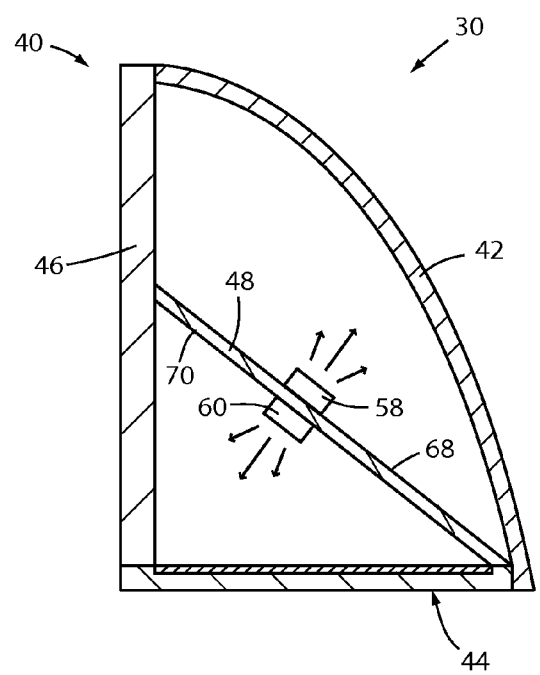
FIG. 4 is an alternative embodiment of the vehicle lighting assembly of FIG. 3.

Referring still to FIG. 3, the lighting assembly 30 may further include at least one light source 58 located in the first compartment 50 and at least one light source 60 located in the second compartment 52. Light sources 58 and 60 may be electrically coupled to a power source onboard a vehicle and may each be provided on a separate printed circuit board (PCB) 62, 64 that is secured to an inner surface 66 of the rear portion 46. In other embodiments, the light sources 58, 60 may be provided on a common PCB. Alternatively, one or both of the light sources 58, 60 may be provided on the partitioning member 48. As exemplarily shown in FIG. 4, light source 58 may be located on one side 68 of the partitioning member 48 and light source 60 may be located on an opposite side 70 of the partitioning member 48. In the illustrated embodiment, the partitioning member 48 may correspond to a double-sided PCB in electrical communication with the light sources 58, 60. In other embodiments, the light sources 58, 60 may be provided on separate PCBs (not shown) that are secured to the corresponding side 68, 70 of the partitioning member 48.

Figure 5:
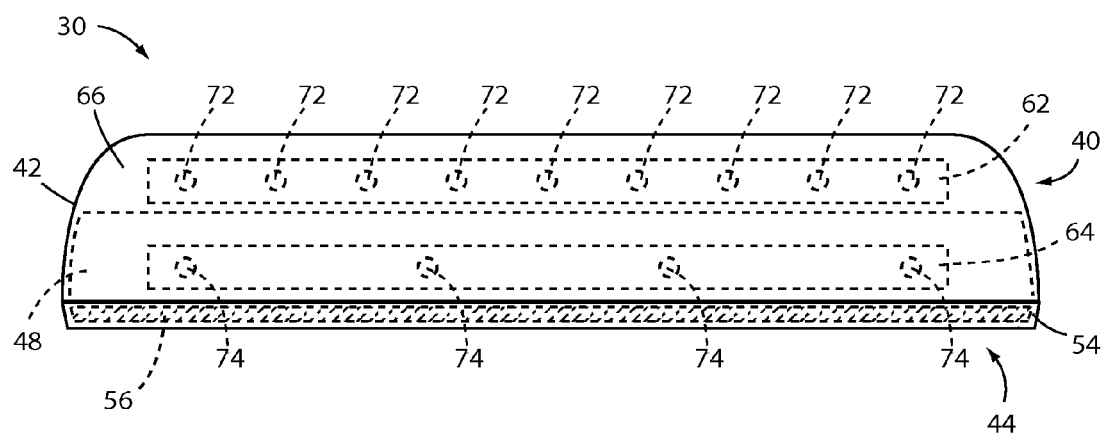
FIG. 5 illustrates one embodiment of a lighting arrangement of the vehicle lighting assembly shown in FIG. 3.

The light sources 58, 60 may include various light types, such as, but not limited to, halogen lights, fluorescent lights, light emitting diodes (LEDs), organic LEDs (OLEDs), and polymer LEDs (PLEDs). For exemplary purposes, FIG. 5 shows a lighting arrangement for the lighting assembly 30 shown in FIG. 3. The lighting arrangement includes a plurality of LEDs 72, 74 provided on PCBs 62 and 64, respectively. PCBS 62 and 64 may extend longitudinally across the rear portion 46 and the LEDs 72, 74 may be arranged in series or in parallel and are spaced longitudinally across the corresponding PCB 62, 64. It should be understood that the number of LEDs 72, 74 on each PCB 62, 64 is not limited to any particular number.

In operation, light emitted from LEDs 72 is outputted from the housing 40 via the light permeable portion 42. LEDs 72 may each emit red light and function as taillights and/or stoplights whereas light emitted from LEDs 74 excites the photoluminescent structure 56 of the photoluminescent portion 44 to generate a visible light that is outputted from the housing 40 via the light dispersing optic 54 to illuminate a rear vehicle license plate (e.g. rear vehicle license plate 36). In one embodiment, the photoluminescent structure 56 may be configured to down convert light received from LEDs 74 to light of a longer wavelength. The light emitted from LEDs 74 may correspond to ultraviolet light (~10-400 nanometers in wavelength), violet light (~380-450 nanometers in wavelength), or blue light (~450-495 nanometers in wavelength). The converted light emitted from the photoluminescent structure 56 may correspond to a visible light, which includes the portion of the electromagnetic spectrum that can be detected by the human eye (~390-700 nanometers in wavelength) and may be expressed in a variety of colors defined by a single wavelength (e.g. red, green, blue) or a mixture of multiple wavelengths (e.g. white). Thus, it should be understood that the photoluminescent structure 56 may be configured such that converted light emitted therefrom is expressed as unicolored or multicolored light.

Referring still to FIG. 5, a greater number of LEDs 72 may be provided on PCB 62 to provide an even distribution of light across the light permeable portion 42. Further, the light permeable portion 42 may be configured to diffuse light received from LEDs 72. As a cost saving measure, a lesser amount of LEDs 74 may be provided on PCB 64 since light emitted from LEDs 74 is not directly visible to an observer and a uniform light distribution across the license plate is generally less noticeable. For optimized light output, the first and second compartments 50, 52 may be configured to internally reflect light. For example, the inner surface 66 and the partitioning member 48 may be coated with a reflective material such as white paint. Also, the PCBs 62, 64 may include a white solder mask in place of the traditional green solder mask for added light reflectance. In such a configuration, wayward propagating light contained within the first compartment 50 is eventually redirected toward the light permeable portion 42 and outputted therefrom. Similarly, wayward propagating light contained within the second compartment 52 is eventually redirected toward the photoluminescent portion 44 to either excite the photoluminescent structure 56 or be outputted from the housing 40 via the light dispersing optic 54.

In the context of the first compartment 50, wayward propagating light should be understood to mean emitted light from LEDs 72 that is not propagating towards the light permeable portion 42. This includes light that has been reflected off the light permeable portion 42 and redirected towards another surface of the first compartment 50. In the context of the second compartment 52, wayward propagating light should be understood to mean emitted light from LEDs 74 that is not propagating toward the photoluminescent portion 44. This includes light that has been reflected off the photoluminescent portion 44 and redirected towards another surface of the second compartment 52. Where the photoluminescent structure 56 is substantially Lambertian, wayward propagating light should also be understood to mean converted light emitted from the photoluminescent structure 56 into the second compartment 52. In such an instance, it is desirable to redirect the converted light back toward the photoluminescent portion 44 so that it may be outputted from the housing 40 via the light dispersing optic 54, thereby increasing the outward illumination provided by the photoluminescent portion 44.

Accordingly a vehicle lighting assembly has been advantageously described herein. The vehicle light assembly provides various benefits including a simple and cost-effective means to produce a variety of illumination that may be implemented as a taillight and/or stoplight in addition to a license plate light.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle lighting assembly comprising:
   a housing including a light permeable portion and a photoluminescent portion; and
   a first light source and a second light source each located inside the housing;
   wherein light emitted from the first light source is outputted from the housing via the light permeable portion and light emitted from the second light source excites the photoluminescent portion to generate a visible light that is outputted from the housing;
   wherein the housing is divided into a first compartment that is at least partially defined by the light permeable portion and a second compartment that is at least partially defined by the photoluminescent portion; and
   wherein the first light source is at least one of a stop light and a rear vehicle light; and wherein the visible light generated by the photoluminescent portion illuminates a license plate.

2. The vehicle lighting assembly of claim 1, wherein the first light source is located inside the first compartment and the first compartment is configured to internally reflect light such that wayward propagating light contained within the first compartment and originating from the first light source is eventually redirected toward the light permeable portion.

3. The vehicle lighting assembly of claim 1, wherein the second light source is located inside the second compartment and the photoluminescent portion is substantially Lambertian; and wherein the second compartment is configured to internally reflect light such that wayward propagating light contained within the second compartment and originating from at least one of the second light source and the photoluminescent portion is eventually redirected toward the photoluminescent portion.

4. The vehicle lighting assembly of claim 1, wherein the light permeable portion is metalized to have a metallic outer appearance while still allowing light emitted from the first light source to be transmitted therethrough.

5. The vehicle lighting assembly of claim 1, wherein the photoluminescent portion includes a photoluminescent structure coupled to a light dispersing optic; wherein the photoluminescent structure is configured to perform an energy conversion on light emitted from the second light source, thereby producing the visible light; and wherein the visible light has a different wavelength than the light emitted from the second light source.

6. A vehicle lighting assembly configured as an exterior trim piece located on a rear portion of a vehicle and positioned above a license plate, comprising:
   a housing including a first compartment having a light permeable portion and a second compartment having a photoluminescent portion; and
   a first light source located in the first compartment and a second light source located in the second compartment;
   wherein light emitted from the first light source is outputted from the housing via the light permeable portion and light emitted from the second light source excites the photoluminescent portion to generate a visible light that is outputted from the housing;
   wherein the first light source is at least one of a stop light and a rear vehicle light; and wherein the visible light generated by the photoluminescent portion illuminates the license plate.

7. The vehicle lighting assembly of claim 6, wherein the first compartment is configured to internally reflect light such that wayward propagating light contained within the first compartment and originating from the first light source is eventually redirected toward the light permeable portion.

8. The vehicle lighting assembly of claim 6, wherein the photoluminescent portion is substantially Lambertian; and wherein the second compartment is configured to internally reflect light such that wayward propagating light contained within the second compartment and originating from at least one of the second light source and the photoluminescent portion is eventually redirected toward the photoluminescent portion.

9. The vehicle lighting assembly of claim 6, wherein the light permeable portion is metalized to have a metallic outer appearance while still allowing light emitted from the first light source to be transmitted therethrough.

10. The vehicle lighting assembly of claim 6, wherein the photoluminescent portion includes a photoluminescent structure coupled to a light dispersing optic; wherein the photoluminescent structure is configured to perform an energy conversion on light emitted from the second light source, thereby producing the visible light; and wherein the visible light has a different wavelength than the light emitted from the second light source.

11. A high mount stop lamp comprising:
    a housing including a light permeable portion and a photoluminescent portion; and
    a first light source and a second light source each located inside the housing;
    wherein the first light source is a rear-vehicle light and outputs light via the light permeable portion; and
    wherein the second light source excites the photoluminescent portion to generate a visible light that illuminates a license plate below the high mount stop lamp.

12. A high mount stop lamp of claim 11, wherein the housing is divided into a first compartment that is at least partially defined by the light permeable portion and a second compartment that is at least partially defined by the photoluminescent portion.

13. A high mount stop lamp of claim 12, wherein the first light source is located inside the first compartment and the first compartment is configured to internally reflect light such that wayward propagating light contained within the first compartment and originating from the first light source is eventually redirected toward the light permeable portion.

14. A high mount stop lamp of claim 12, wherein the second light source is located inside the second compartment and the photoluminescent portion is substantially Lambertian; and wherein the second compartment is configured to internally reflect light such that wayward propagating light contained within the second compartment and originating from at least one of the second light source and the photoluminescent portion is eventually redirected toward the photoluminescent portion.

15. A high mount stop lamp of claim 11, wherein the light permeable portion is metalized to have a metallic outer appearance while still allowing light emitted from the first light source to be transmitted therethrough.

16. A high mount stop lamp of claim 11, wherein the photoluminescent portion includes a photoluminescent structure coupled to a light dispersing optic; wherein the photoluminescent structure is configured to perform an energy conversion on light emitted from the second light source, thereby producing the visible light; and wherein the visible light has a different wavelength than the light emitted from the second light source.

* * * * *